(12) United States Patent
Komaki

(10) Patent No.: US 10,268,423 B2
(45) Date of Patent: Apr. 23, 2019

(54) IMAGE FORMING APPARATUS AND NON-TRANSITORY COMPUTER READABLE MEDIUM

(71) Applicant: FUJI XEROX CO., LTD., Tokyo (JP)

(72) Inventor: Katsue Komaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/437,825

(22) Filed: Feb. 21, 2017

(65) Prior Publication Data

US 2018/0081597 A1    Mar. 22, 2018

(30) Foreign Application Priority Data

Sep. 20, 2016 (JP) .................. 2016-183184

(51) Int. Cl.
    *G06F 3/12* (2006.01)

(52) U.S. Cl.
    CPC ............ *G06F 3/121* (2013.01); *G06F 3/1221* (2013.01); *G06F 3/1222* (2013.01); *G06F 3/1224* (2013.01); *G06F 3/1229* (2013.01); *G06F 3/1238* (2013.01); *G06F 3/1262* (2013.01); *G06F 3/1267* (2013.01); *G06F 3/1291* (2013.01)

(58) Field of Classification Search
    CPC combination set(s) only.
    See application file for complete search history.

(56) References Cited

U.S. PATENT DOCUMENTS

| 2005/0071495 | A1* | 3/2005 | Kadota | G03G 15/55 709/232 |
| 2006/0239736 | A1 | 10/2006 | Kitada | |
| 2007/0201087 | A1* | 8/2007 | Saito | H04L 9/0825 358/1.15 |
| 2013/0135661 | A1* | 5/2013 | Ishigure | G06K 15/02 358/1.14 |
| 2014/0078531 | A1* | 3/2014 | Park | G06F 3/122 358/1.13 |
| 2017/0090833 | A1* | 3/2017 | Kawano | G06F 3/1224 |
| 2017/0371607 | A1* | 12/2017 | Okada | G06F 3/1291 |
| 2018/0025338 | A1* | 1/2018 | Araya | G06Q 20/201 |

FOREIGN PATENT DOCUMENTS

JP  2006-309705 A  11/2006
JP  2011-003056 A  1/2011

* cited by examiner

*Primary Examiner* — Helen Zong
(74) *Attorney, Agent, or Firm* — Oliff PLC

(57) ABSTRACT

An image forming apparatus includes a holding unit, a search unit, an update unit, and a transmitting unit. The holding unit holds group information including identification information of a different image forming apparatus belonging to a group to which the image forming apparatus belongs. The search unit searches for a candidate image forming apparatus to which the image forming information is to be transmitted at a predetermined timing when elimination of the image forming information is estimated. The update unit updates the group information such that the candidate image forming apparatus found by the search unit is included in the group. The transmitting unit transmits the group information updated by the update unit to the different image forming apparatus at the predetermined timing.

17 Claims, 12 Drawing Sheets

FIG. 11

```
EXTERNAL STORAGE
  └── GROUP A
        ├── MANAGEMENT INFORMATION
        ├── FILE A
        ├── FILE B1
        └── . . .
```

FIG. 12

| FILE NAME | USER NAME | TIMESTAMP |
|---|---|---|
| FILE A | USER A | 2016/09/01 10:10 |
| FILE B1 | USER B | 2016/09/03 15:30 |
| . . . | . . . | . . . |

26

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-183184 filed Sep. 20, 2016.

BACKGROUND

Technical Field

The present invention relates to an image forming apparatus, an image forming method, and a non-transitory computer readable medium.

SUMMARY

According to an aspect of the invention, there is provided an image forming apparatus including a holding unit, a search unit, an update unit, and a transmitting unit. The holding unit holds group information including identification information of a different image forming apparatus belonging to a group to which the image forming apparatus belongs. The search unit searches for a candidate image forming apparatus to which the image forming information is to be transmitted at a predetermined timing when elimination of the image forming information is estimated. The update unit updates the group information such that the candidate image forming apparatus found by the search unit is included in the group. The transmitting unit transmits the group information updated by the update unit to the different image forming apparatus at the predetermined timing.

BRIEF DESCRIPTION OF THE DRAWINGS

Exemplary embodiments of the present invention will be described in detail based on the following figures, wherein:

FIG. 11 is a schematic diagram illustrating an example of a data structure of an external storage according to the third exemplary embodiment and a fourth exemplary embodiment;

FIG. 12 is a front view illustrating an example of management information according to the third exemplary embodiment and the fourth exemplary embodiment;

DETAILED DESCRIPTION

Hereinafter, exemplary embodiments of the present invention will be described in detail with reference to the drawings.

First Exemplary Embodiment

First, an image forming system 100 according to a first exemplary embodiment will be described.

Figure 1:
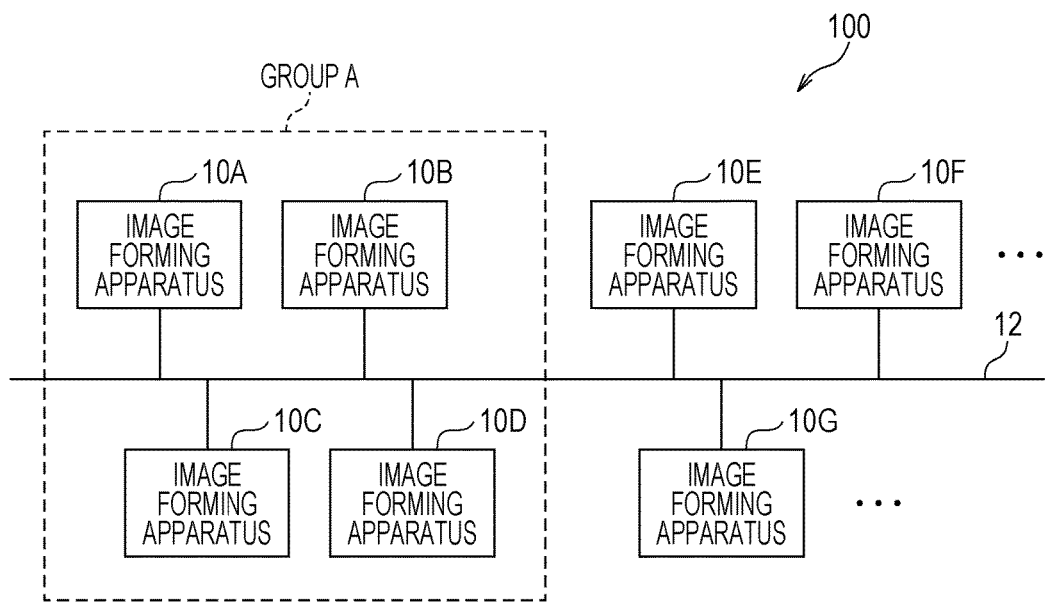
FIG. 1 is a block diagram illustrating functions of an image forming system according to an exemplary embodiment.

FIG. 1 is a block diagram illustrating an entire configuration of the image forming system 100 according to an exemplary embodiment of the present invention. As illustrated in FIG. 1, the image forming system 100 includes multiple image forming apparatuses 10A, 10B, 10C, and so on. The image forming apparatuses 10A, 10B, 10C, and so on are connected to one another via a communication network 12. Hereinafter, in the case where the image forming apparatuses 10A, 10B, 10C, and so on are not distinguished from each other, the image forming apparatuses 10A, 10B, 10C, and so on will be each referred to as an image forming apparatus 10.

Figure 2:
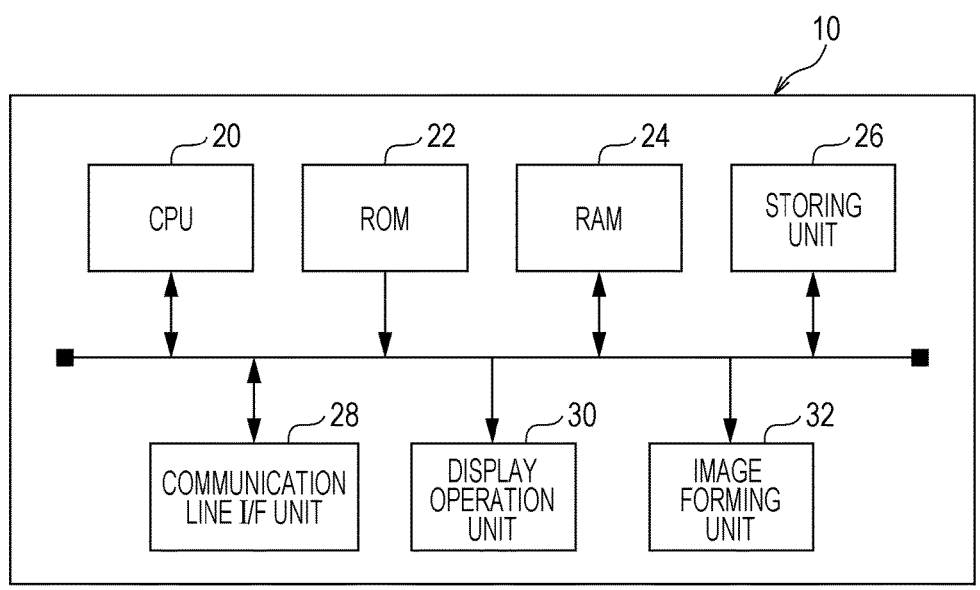
FIG. 2 is a block diagram illustrating an electrical configuration of an image forming apparatus according to an exemplary embodiment.

FIG. 2 is a configuration diagram illustrating an electrical configuration of the image forming apparatus 10 according to the first exemplary embodiment. As illustrated in FIG. 2, the image forming apparatus 10 according to the first exemplary embodiment includes a central processing unit (CPU) 20, as an example of a search unit, an update unit, a transmitting unit, an acquisition unit, and a storing unit, which controls the entire apparatus. The units of the image forming apparatus 10 illustrated in FIG. 1 perform processing under the control of the CPU 20. The image forming apparatus 10 further includes a read only memory (ROM) 22 which stores a program and various types of information to be used for processing of the CPU 20. The image forming apparatus 10 also includes a random access memory (RAM) 24 which temporarily stores various data as an operation area of the CPU 20 and a storing unit 26, as an example of a holding unit, which stores various types of information to be used for processing of the CPU 20. The image forming apparatus 10 also includes a communication line interface (I/F) unit 28 which communicates with an external apparatus. The image forming apparatus 10 also includes a display operation unit 30 which includes a display such as a display for displaying various types of information and an operation unit such as a touch panel for inputting various types of information when being operated by a user. The image forming apparatus 10 also includes an image forming unit 32 which forms an image based on image forming information for issuance of an image forming instruction.

Now, a configuration of the image forming unit 32 and an image forming process performed by the image forming unit 32 will be explained. The image forming unit 32 includes a photoreceptor as an image holding body for each color. The surfaces of the photoreceptors are charged by application of a charging bias. Furthermore, the image forming unit 32 acquires image data of individual colors, forms electrostatic latent images on the photoreceptors by causing the charged surfaces of the photoreceptors to be exposed to exposure light modulated based on the image data of the corresponding colors, and causes the photoreceptors to hold developers (toner) of the corresponding colors. The image forming unit 32 also includes a developing roll for each color. By applying developing biases to the individual developing rolls, the image forming unit 32 develops the electrostatic latent images on the photoreceptors with toner of the corresponding colors and forms toner images on the photoreceptors. Furthermore, the image forming unit 32 transfers the toner images of the individual colors on the photoreceptors to an intermediate transfer belt, and transfers and fixes the toner images transferred to the intermediate transfer belt to a recording medium such as paper. Accordingly, an image is formed on the recording medium.

In the image forming system 100 according to the first exemplary embodiment, some of the image forming apparatuses 10 form a group. In the example illustrated in FIG. 1, the image forming apparatus 10A, the image forming apparatus 10B, the image forming apparatus 10C, and the image forming apparatus 10D belong to a "group A". Hereinafter, explanation will be provided by referring to the image forming apparatus 10A, the image forming apparatus 10B, the image forming apparatus 10C, and the image forming apparatus 10D as an "apparatus A", an "apparatus B", an "apparatus C", and an "apparatus D", respectively.

Figure 3:
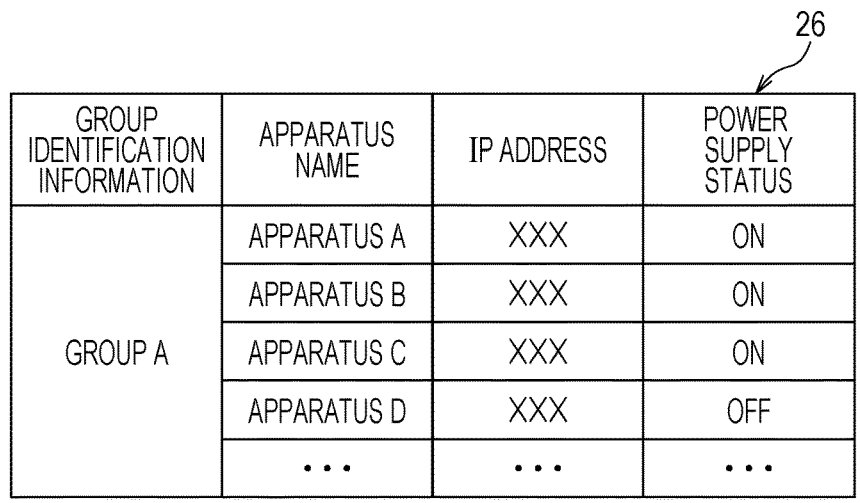
FIG. 3 is a schematic diagram illustrating an example of group information according to an exemplary embodiment.

In the case where an image forming apparatus 10 belongs to a group, group information regarding the group to which the image forming apparatus 10 belongs is input in advance to the image forming apparatus 10 by a user and stored in the storing unit 26. For example, as illustrated in FIG. 3, group information includes identification information of a group. Furthermore, the group information includes, for each image forming apparatus, the apparatus name of the image forming apparatus which belongs to the group, the IP address of the image forming apparatus, and the power supply status of the image forming apparatus, which are in association with one another.

In the example illustrated in FIG. 3, for example, in the case where power is turned on, the power supply status of an image forming apparatus is indicated as "ON", and in the case where power is not turned on, the power supply status of an image forming apparatus is indicated as "OFF". In the first exemplary embodiment, by taking into consideration that image forming information is backed up among the image forming apparatuses 10 which belong to one group, only image forming apparatuses 10 whose power is turned on among the image forming apparatuses 10 included in group information are treated as image forming apparatuses 10 belonging to the group.

The data format of group information is not limited to the above example. For example, in each of the image forming apparatuses 10, only at least identification information of a group to which the image forming apparatus 10 belongs needs to be stored in advance in the storing unit 26. In this case, an image forming apparatus 10 searches for another image forming apparatus 10 having the same identification information in the image forming system 100, acquires the apparatus name and the IP address of the found image forming apparatus 10 as an image forming apparatus 10 which belongs to the same group, and stores the acquired apparatus name and IP address of the image forming apparatus 10 as group information.

The image forming apparatus 10 according to the first exemplary embodiment searches, at a predetermined timing when elimination of image forming information stored in an image forming apparatus 10 is estimated, for a candidate image forming apparatus to which the image forming information is to be transmitted, and stores in the storing unit 26 group information which is updated such that the found candidate image forming apparatus 10 is included in the same group. Furthermore, the image forming apparatus 10 transmits the updated group information to other image forming apparatuses 10 belonging to the same group.

In the first exemplary embodiment, a case where the above-mentioned predetermined timing is a timing when the power of the image forming apparatus 10 is turned off is explained. However, the present invention is not limited to this. The predetermined timing may be, for example, a timing when the storage capacity of the storing unit 26 falls below a storage capacity necessary for storing image forming information, a timing when a predetermined time (for example, one hour) has passed since the image forming apparatus 10 started, a timing designated by a user using the display operation unit 30, or the like.

Furthermore, each group is formed based on, for example, the following conditions:

(a) image forming apparatuses 10 installed in a department of a company are considered as one group;

(b) image forming apparatuses 10 of one type are considered as one group; and (c) image forming apparatuses 10 selected by a user are considered as one group.

The image forming apparatus 10 performs a group registering process for transmitting change information indicating that group information has been changed to a different image forming apparatus 10 belonging to the same group at a timing when the power of the image forming apparatus 10 is turned on. Furthermore, the image forming apparatus 10 performs a data transmitting process for transmitting image data stored in the image forming apparatus 10 to a different image forming apparatus 10 belonging to the same group at the above-mentioned predetermined timing, that is, at the timing when the power of the image forming apparatus 10 is turned off.

Figure 4:
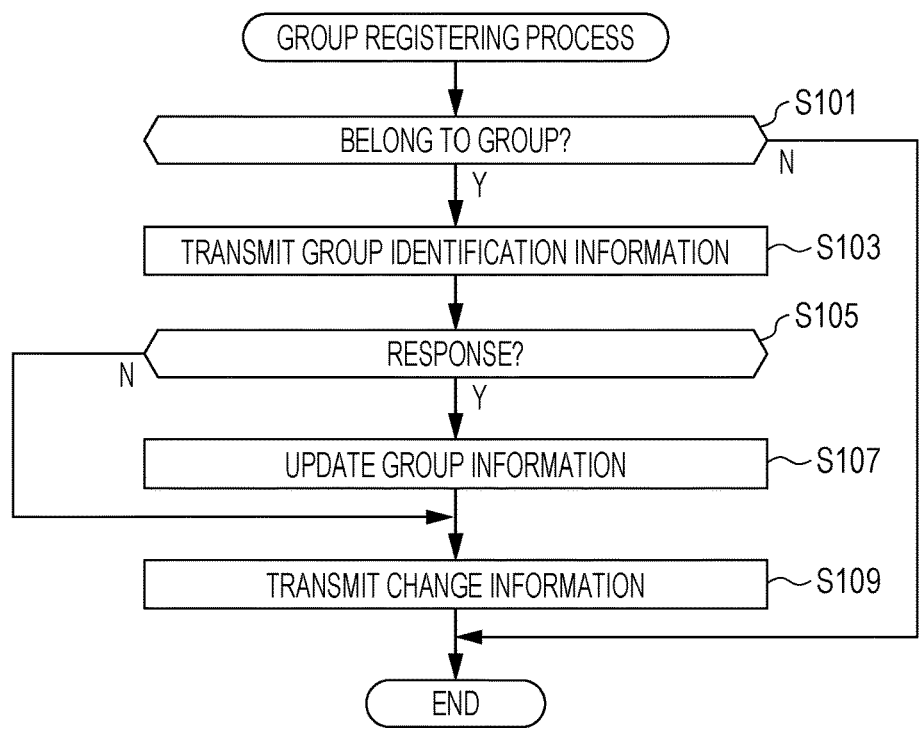
FIG. 4 is a flowchart illustrating the processing flow of a program of a registration control process according to a first exemplary embodiment.

First, the flow of a group registering process according to the first exemplary embodiment will be described. FIG. 4 is a flowchart illustrating the processing flow of a program of a group registering process performed by the CPU 20 at a timing when the power of the image forming apparatus 10 is turned on. In the first exemplary embodiment, the program of the group registering process is stored in advance in the storing unit 26. However, the present invention is not limited to this. For example, the program of the group registering process may be received from an external apparatus via the communication line I/F unit 28 and executed. Furthermore, the program of the group registering process recorded in a recording medium such as a compact disc-read only memory (CD-ROM) may be read by a CD-ROM drive or the like so that the group registering process may be preformed.

In group information stored in the storing unit 26, the power supply status of other image forming apparatuses 10 belonging to the same group is set to "OFF" as a default status.

In step S101, the CPU 20 determines whether or not the image forming apparatus 10 belongs to a group. In the first exemplary embodiment, in the case where group information is stored in the storing unit 26, it is determined that the image forming apparatus 10 belongs to a group. In the case where it is determined in step S101 that the image forming apparatus 10 belongs to a group (S101, Y), the process proceeds to step S103. In the case where it is determined in step S101 that the image forming apparatus 10 does not belong to a group (S101, N), execution of the program of the group registering process ends.

In step S103, the CPU 20 transmits group identification information of the group to which the image forming apparatus 10 belongs to a different image forming apparatus 10 via the communication network 12. Upon receiving the group identification information, the different image forming apparatus 10 determines whether or not the group indicated by the received group identification information is the same as the group to which the different image forming apparatus 10 belongs. In the case where the group indicated by the received group identification information is the same as the group to which the different image forming apparatus 10 belongs, the different image forming apparatus 10 sends a response to the image forming apparatus 10 from which the group identification information is transmitted.

In step S105, the CPU 20 determines whether or not there is a response from the different image forming apparatus 10 belonging to the same group. In the first exemplary embodiment, in the case where there is a response from the different image forming apparatus 10 before a predetermined time (for example, one minute) has passed since the group identification information was transmitted, it is determined that there is a response from the different image forming apparatus 10 belonging to the same group.

In the case where it is determined in step S105 that there is a response from the different image forming apparatus 10 belonging to the same group (S105, Y), the process proceeds to step S107. In the case where it is determined in step S105 that there is no response from the different image forming apparatus 10 belonging to the same group (S105, N), the process proceeds to step S109.

In step S107, the CPU 20 updates the group information stored in the storing unit 26 in accordance with the response from the different image forming apparatus 10 belonging to the same group. In the first exemplary embodiment, in group information, the power supply status of the image forming apparatus 10 which belongs to the same group and from which a response is sent is changed to "ON", and the power supply status of the image forming apparatus 10 which belongs to the same group and from which no response is sent remains "OFF".

In step S109, the CPU 20 transmits change information indicating that the power supply status of the image forming apparatus 10 has been changed from "OFF" to "ON" to the different image forming apparatus 10 belonging to the same group, and execution of the program of the group registering process ends. Upon receiving the change information, the different image forming apparatus 10 belonging to the same group changes the power supply status of the image forming apparatus 10 from which the change information is transmitted to "ON" in the group information stored in the corresponding storing unit 26.

Figure 5:
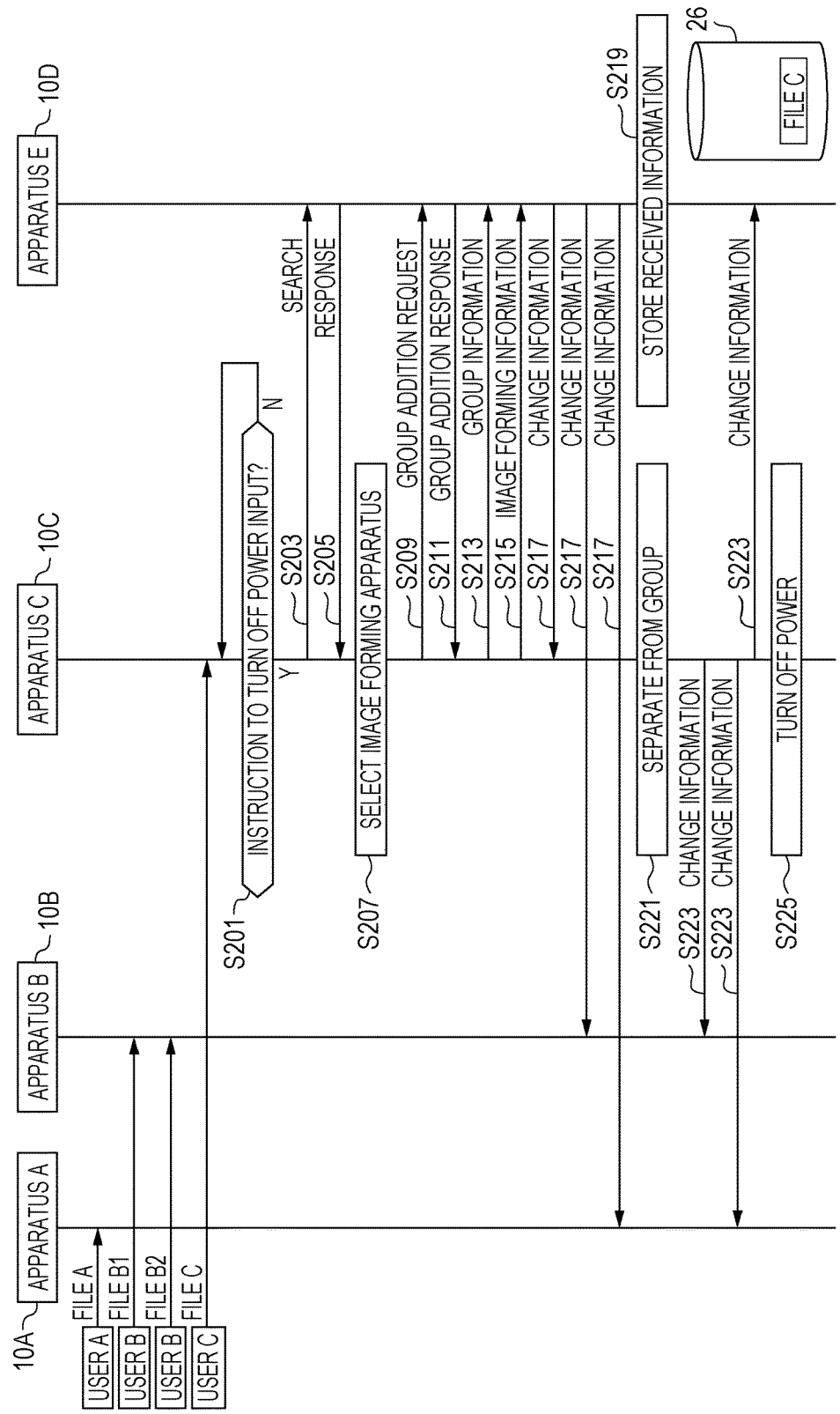
FIG. 5 is a flowchart illustrating the processing flow of a program of a data transmitting process according to the first exemplary embodiment.

Next, the flow of a data transmitting process according to the first exemplary embodiment will be described. FIG. 5 is a flowchart illustrating the processing flow of a program of a data transmitting process performed by the CPU 20 at a timing when an instruction to turn off the power of the image forming apparatus 10 is issued. In the first exemplary embodiment, the program of the data transmitting process is stored in advance in the storing unit 26. However, the present invention is not limited to this. For example, the program of the data transmitting process may be received from an external apparatus via the communication line I/F unit 28 and executed. Furthermore, the program of the data transmitting process recorded in a recording medium such as a CD-ROM may be read by a CD-ROM drive or the like so that the data transmitting process may be preformed.

For example, a case where a user A transmits a file A, which is image forming information, to the apparatus A, a user B transmits a file B1 and a file B2, which are image forming information, to the apparatus B, and a user C transmits a file C, which is image forming information, to the apparatus C, as illustrated in FIG. 5, will be explained. Furthermore, in this example, a case where the apparatuses A, B, and C belong to one group and the apparatus C performs a data transmitting process will be explained.

In step S201, the CPU 20 determines whether or not an instruction to turn off the power is input by a user using the display operation unit 30. In the case where it is determined in step S201 that an instruction to turn off the power is input (S201, Y), the process proceeds to step 203. In the case where it is determined in step S201 that an instruction to turn off the power is not input (S203, N), the CPU 20 waits until an instruction to turn off the power is input.

In step S203, the CPU 20 searches for an image forming apparatus 10 which does not belong to the same group and which satisfies a predetermined condition. The predetermined condition represents an image forming apparatus 10 which may store the image forming information held by the apparatus C, that is, for example, an image forming apparatus 10 which has a storage capacity for loading the image forming information transmitted from the apparatus C. In this case, the apparatus C transmits information indicating the storage capacity necessary for loading the image forming information held by the apparatus C to image forming apparatuses 10 connected to the communication network 12, and an image forming apparatus 10 having the necessary storage capacity sends a response to the apparatus C. Accordingly, the image forming apparatus 10 satisfying the predetermined condition may be found. Furthermore, the predetermined condition may represent, for example, an image forming apparatus 10 of the same type as the apparatus C. In this case, the apparatus C transmits information indicating the type of the apparatus C to image forming apparatuses 10 connected to the communication network 12, and an image forming apparatus 10 of the same type as the apparatus C sends a response to the apparatus C. Accordingly, the image forming apparatus 10 satisfying the predetermined condition may be found. Furthermore, the predetermined condition may represent an image forming apparatus 10 manufactured by the same manufacturer as that of the apparatus C. In this case, the apparatus C transmits information indicating a manufacturer of the apparatus C to image forming apparatuses 10 connected to the communication network 12, and an image forming apparatus 10 whose manufacturer is the same as that of the apparatus C sends a response to the apparatus C. Accordingly, the image forming apparatus 10 satisfying the predetermined condition may be found.

In this example, a case where multiple image forming apparatuses 10 including the apparatus E satisfy the predetermined condition will be explained. A case where there is no image forming apparatus 10 which satisfies the predetermined condition will be described later with reference to FIG. 7.

In step S205, in the case where the image forming apparatus 10 (apparatus E or the like) which satisfies the predetermined condition satisfies a condition indicated by the received condition information, the CPU 20 of the image forming apparatus 10 sends a response to the apparatus C.

In step S207, the CPU 20 selects an image forming apparatus 10 as a transmission target of the image forming information from among the image forming apparatuses 10 which send a response in step S205. In the case where multiple image forming apparatuses 10 send a response in step S205, the image forming apparatus 10 having the largest storage capacity for loading the image forming information transmitted from the apparatus C is selected. For example, the apparatus C receives information indicating the storage capacity with which image forming information may be loaded from each of the multiple image forming apparatuses 10, and the image forming apparatus 10 having the largest storage capacity for loading the image forming information transmitted from the apparatus C is selected. A case where the apparatus E is selected will be described.

In step S209, the CPU 20 transmits group request information for requesting for addition to the same group to the selected image forming apparatus 10 (apparatus E).

In step S211, the image forming apparatus 10 (apparatus E) which has received the group request information transmits a group addition response indicating that addition to the same group has been accepted to the image forming apparatus 10 (apparatus C) from which the group request information is transmitted.

In step S213, the CPU 20 transmits the group information stored in the storing unit 26 to the image forming apparatus 10 selected in step S207.

In step S215, the CPU 20 transmits the image forming information stored in the storing unit 26 to the image forming apparatus 10 selected in step S207.

Figure 6:
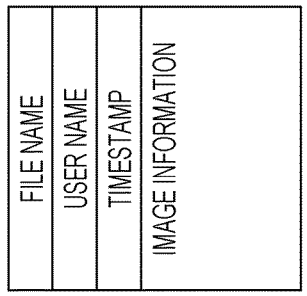
FIG. 6 is a schematic diagram illustrating an example of image forming information according to an exemplary embodiment.

In step S217, the image forming apparatus 10 (apparatus E) which has received the group information in step S211 transmits change information indicating that a change to add the image forming apparatus 10 to the group information has been made to the image forming apparatuses (apparatus A, apparatus B, and apparatus C) belonging to the same group. For example, as illustrated in FIG. 6, image forming information includes the file name of the image forming information, the user name of a user who has transmitted the image forming information, a timestamp indicating the time at which the image forming information was received, and image information indicating an image to be formed.

In step S219, the image forming apparatus 10 (apparatus E) which has received the image forming information in step S215 causes the storing unit 26 to store the received image forming information.

In step S221, the CPU 20 performs processing for separating the image forming apparatus 10 from the group to which the image forming apparatus 10 belongs. In the first exemplary embodiment, for example, in the group information stored in the storing unit 26, by changing the power supply status of the image forming apparatus 10 to "OFF", the image forming apparatus 10 is separated from the group to which the image forming apparatus 10 belongs.

In step S223, the CPU 20 transmits change information indicating that the power supply status of the image forming apparatus 10 has been changed to "OFF" to the other image forming apparatuses 10 (apparatus A, apparatus B, and apparatus C) belonging to the same group. Upon receiving the change information, each of the other image forming apparatuses 10 changes the power supply status of the image forming apparatus 10 from which the change information has been transmitted in the group information stored in the corresponding storing unit 26 to "OFF".

In step S225, the CPU 20 turns off the power of the image forming apparatus 10, and execution of the program of the data transmission process ends.

Figure 7:
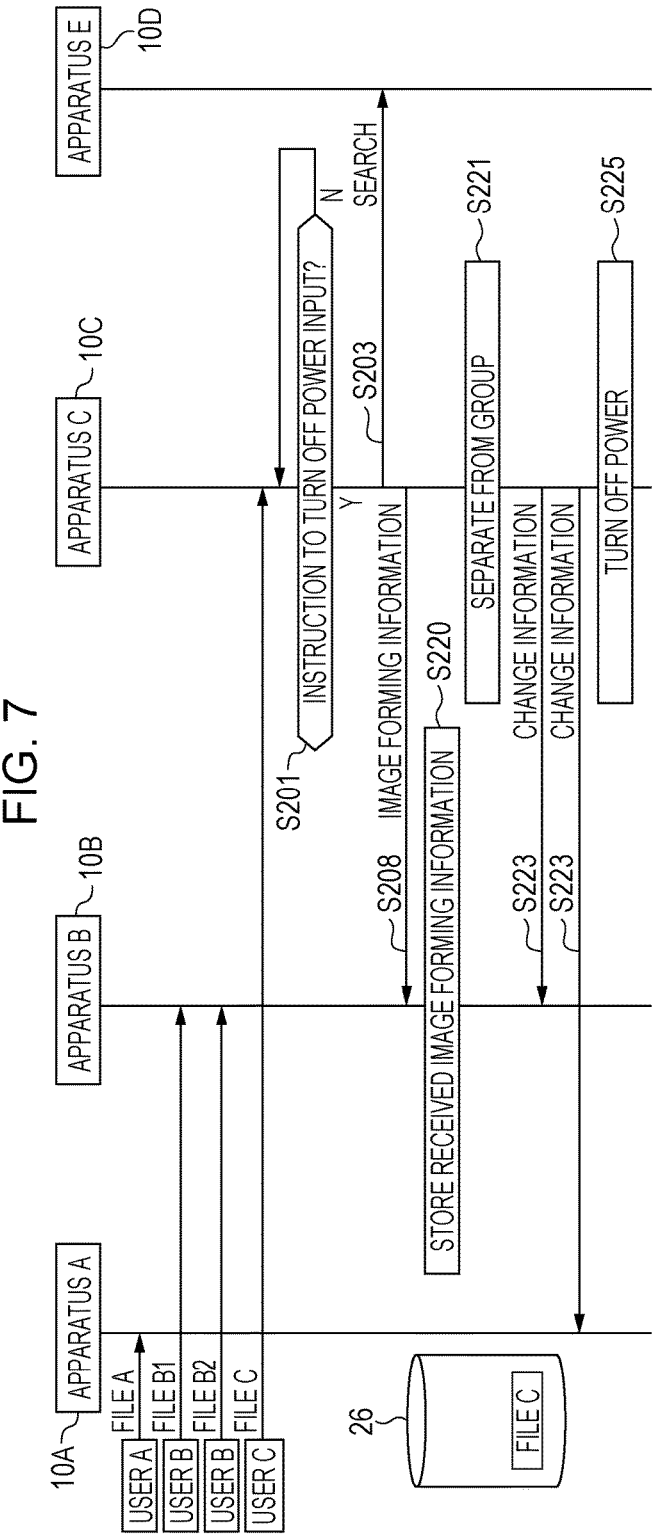
FIG. 7 is a flowchart illustrating another example of the program of the data transmitting process according to the first exemplary embodiment.

Furthermore, the data transmission process for the case where there is no image forming apparatus 10 which satisfies the predetermined condition in steps S203 to S207 as described above will be described below with reference to a flowchart of FIG. 7. In FIG. 7, steps of the same processing as that in FIG. 5 will be referred to with the same reference signs, and explanation for those steps will be omitted.

In the case where there is no response before a predetermined time (for example, one minute) has passed since search for an image forming apparatus 10 which does not belong to the same group and which satisfies the predetermined condition was started in step S203, the process proceeds to step S208.

In step S208, the CPU 20 transmits the image forming information stored in the storing unit 26 to the image forming apparatus 10 (at least one of the apparatus A and the apparatus B) belonging to the same group, and the process proceeds to step S220.

In step S220, the image forming apparatus 10 which has received the image forming information in step S208 causes the storing unit 26 to store the received image forming information, and the process proceeds to step S221.

As described above, in the first exemplary embodiment, multiple image forming apparatuses 10 form one group. Therefore, in the case where a user transmits image forming information to any of the image forming apparatuses 10 belonging to the same group, by operating the display operation unit 30 of the image forming apparatus 10 belonging to the same group, an instruction for image formation may be issued.

That is, in the first exemplary embodiment, an image forming apparatus 10 holds group information including identification information of the other image forming apparatuses 10 belonging to the same group as that to which the image forming apparatus 10 belongs, searches for a candidate image forming apparatus 10 to which image forming information is to be transmitted at a predetermined timing when elimination of image forming information is estimated, and holds group information which has been updated such that the found candidate image forming apparatus 10 is included in the same group. Furthermore, at the predetermined timing, the image forming apparatus 10 transmits the updated group information and the image forming information to the other image forming apparatuses 10.

Consequently, elimination of the image forming information is avoided.

Second Exemplary Embodiment

Next, the image forming system 100 according to a second exemplary embodiment will be described.

In the first exemplary embodiment, the case where image forming information is transmitted to a different image forming apparatus at a timing when the power is turned off has been described. In the second exemplary embodiment, a case where image forming information is transmitted to a different image forming apparatus at a timing earlier than the timing when the power is turned off will be described.

As illustrated in FIGS. 1 and 2, the configuration of the image forming system 100 according to the second exemplary embodiment is the same as the image forming system 100 according to the first exemplary embodiment. Therefore, explanation for the configuration of the image forming system 100 according to the second exemplary embodiment will be omitted.

Figure 8:
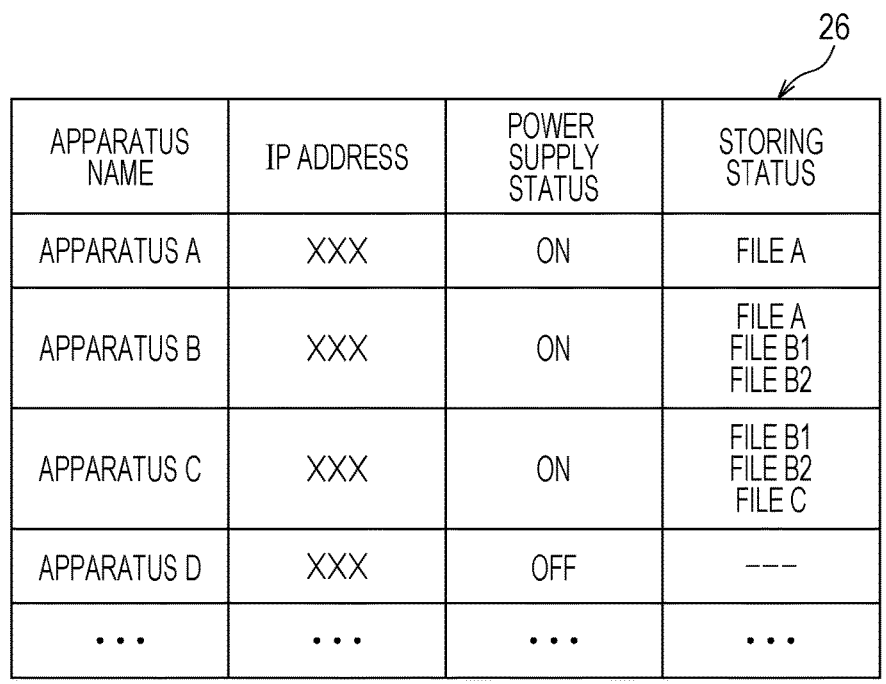
FIG. 8 is a schematic diagram illustrating another example of the group information according to an exemplary embodiment.

For example, as illustrated in FIG. 8, in group information according to the second exemplary embodiment, the apparatus name of an image forming apparatus belonging to a group, the IP address of the image forming apparatus, the power supply status of the image forming apparatus, and identification information of image forming information stored in the image forming apparatus are stored in association with one another for each image forming apparatus.

Furthermore, the image forming system 100 according to the second exemplary embodiment performs the same process as the group registering process performed by the image forming system 100 according to the first exemplary embodiment. Therefore, explanation for the group registering process according to the second exemplary embodiment will be omitted.

Figure 9:
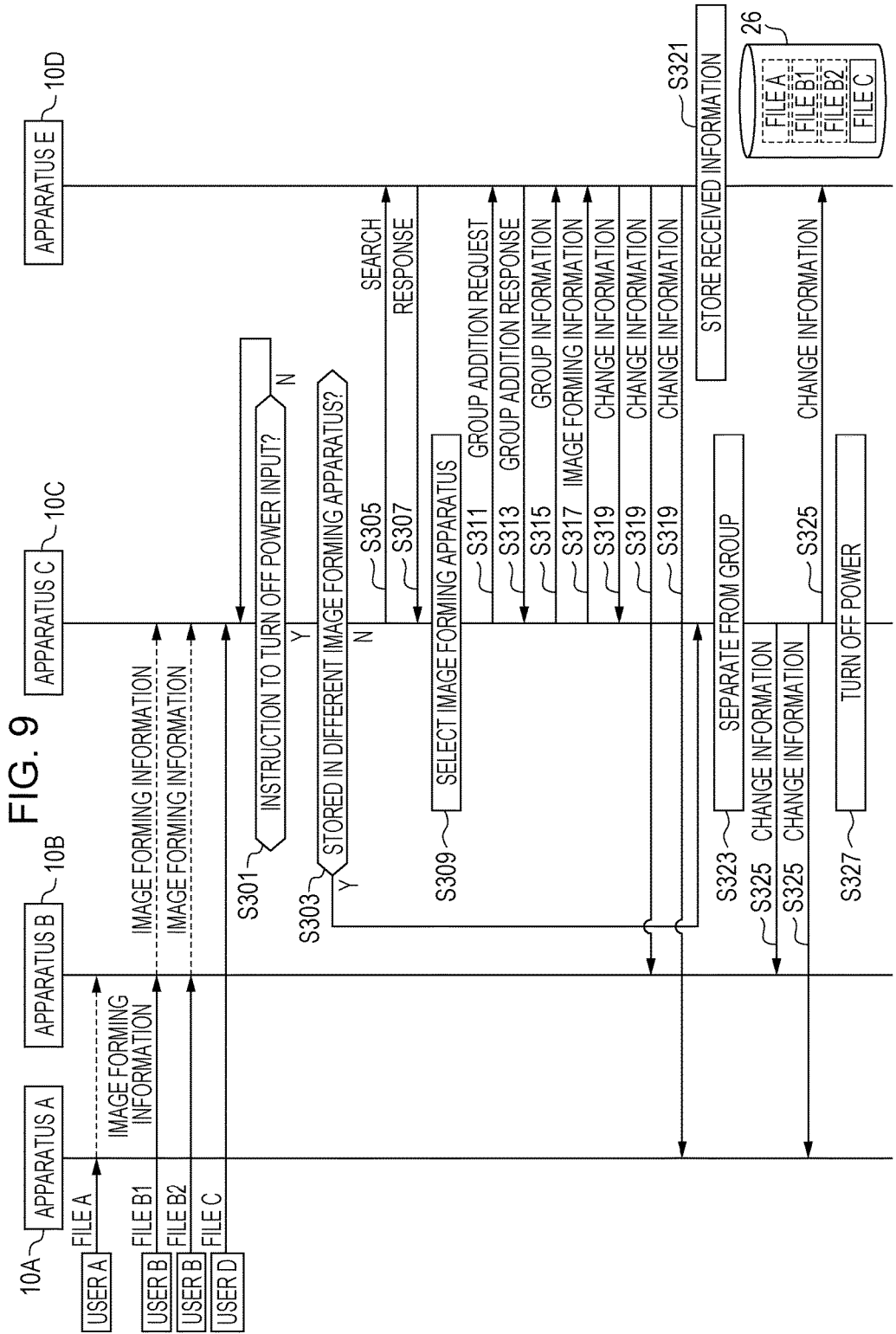
FIG. 9 is a flowchart illustrating the processing flow of a program of a data transmitting process according to a second exemplary embodiment.

Next, the flow of a data transmitting process performed by the image forming apparatus 10 according to the second exemplary embodiment will be described with reference to a flowchart of FIG. 9. FIG. 9 is a flowchart illustrating the processing flow of a program of a data transmitting process performed by the CPU 20 at a timing when an instruction to turn off the power of the image forming apparatus 10 is issued. In the second exemplary embodiment, the program of the data transmitting process is stored in advance in the storing unit 26. However, the present invention is not limited to this. For example, the program of the data transmitting process may be received from an external apparatus via the communication line I/F unit 28 and executed. Furthermore, the program of the data transmitting process recorded in a recording medium such as a CD-ROM may be read by a CD-ROM drive or the like so that the data transmitting process may be preformed.

In the second exemplary embodiment, for example, as illustrated in FIG. 9, a user A transmits a file A to an apparatus A, and the apparatus A transmits the file A to an image forming apparatus (apparatus B) belonging to the same group within a period from reception of the file A to input of an instruction to turn off the power. A user B transmits a file B1 and a file B2 to the apparatus B, and the apparatus B transmits the file B1 and the file B2 to an image forming apparatus (apparatus C) belonging to the same group within a period from reception of the file B1 and the file B2 to input of an instruction to turn off the power.

Accordingly, as illustrated in FIG. 8, the file A transmitted to the apparatus A is stored in the apparatus B as well as in the apparatus A. Furthermore, the file B1 and the file B2 transmitted to the apparatus B is stored in the apparatus C as well as in the apparatus B.

Furthermore, in the second exemplary embodiment, a case where a user C transmits a file C to the apparatus C will be explained. Furthermore, a case where the apparatus A, the apparatus B, and the apparatus C belong to one group and the apparatus C performs a data transmitting process will be explained.

In step S301, the CPU 20 determines whether or not an instruction to turn off the power is input by a user using the display operation unit 30. In the case where it is determined in step S301 that an instruction to turn off the power is input (S301, Y), the process proceeds to step S303. In the case where it is determined in step S301 that an instruction to turn off the power is not input (S303, N), the CPU 20 waits until an instruction to turn off the power is input.

In step S303, the CPU 20 determines whether or not image forming information stored in the storing unit 26 is stored in a different image forming apparatus belonging to the same group. In the second exemplary embodiment, it is determined, by referring to storing status of group information, whether or not the image forming information stored in the storing unit 26 is stored in a different image forming apparatus belonging to the same group.

In the case where it is determined in step S303 that the image forming information is stored in a different image forming apparatus belonging to the same group (S303, Y), the process proceeds to step S323. In the case where it is determined in step S303 that the image forming information is not stored in a different image forming apparatus belonging to the same group (S303, N), the process proceeds to step S305.

In steps S305 to S327, the same processing as that in steps S203 to S225 in FIG. 5 is performed, and execution of the program of the data transmitting process ends.

Change information transmitted in step S319 includes, in addition to information indicating that a change such as addition of the image forming apparatus 10 to the group information has been made, identification information of image forming information (including the image forming information received in step S317) stored in the storing unit 26.

As described above, in the second exemplary embodiment, within a period from acquisition of the image forming information to the above-mentioned predetermined timing, the image forming information is transmitted to a different image forming apparatus belonging to the same group. Furthermore, the image forming information is transmitted to the different image forming apparatus 10 belonging to the same group in the case where the image forming information is not transmitted to a different image forming apparatus 10 at the above-mentioned predetermined timing.

Accordingly, image forming information is stored in multiple image forming apparatuses 10, and the image forming information is thus always backed up. In addition, even in the case where image forming information is not transmitted to a different image forming apparatus 10 belonging to the same group, elimination of the image forming information is avoided.

Third Exemplary Embodiment

Next, an image forming system 100 according to a third exemplary embodiment will be described.

In the third exemplary embodiment, a case where an external storage, which is an external storing device which stores image forming information, is connected to the image forming apparatus 10 will be explained.

As illustrated in FIGS. 1 and 2, the configuration of the image forming system 100 according to the third exemplary embodiment is the same as the image forming system 100 according to the first exemplary embodiment. Therefore, explanation for the configuration of the image forming system 100 according to the third exemplary embodiment will be omitted.

Figure 10:
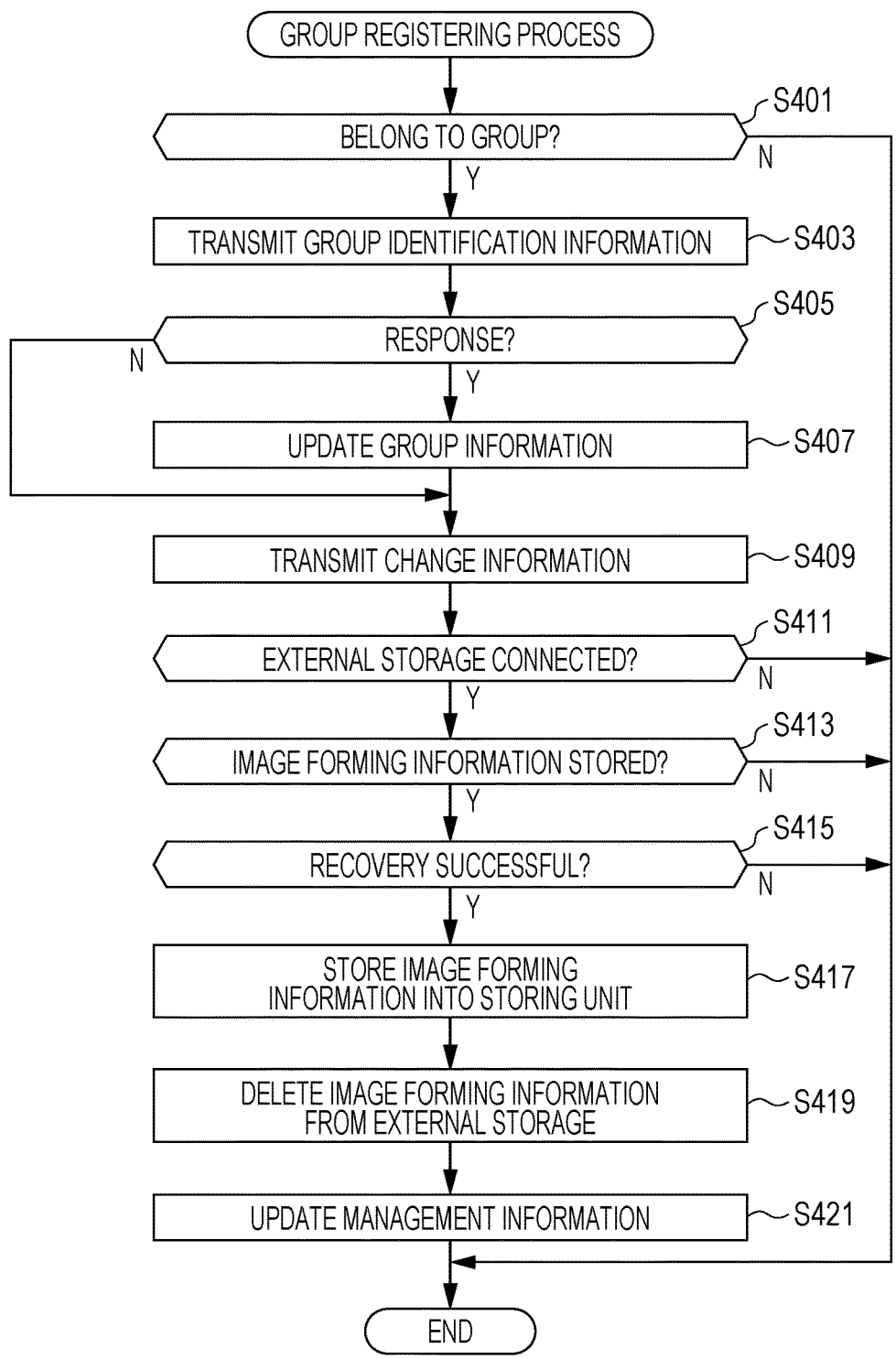
FIG. 10 is a flowchart illustrating the processing flow of a program of a group registering process according to a third exemplary embodiment.

First, the flow of a group registering process according to the third exemplary embodiment will be described. FIG. 10 is a flowchart illustrating the processing flow of a program of a group registering process performed by the CPU 20 at a timing when the power of the image forming apparatus 10 is turned on. In the third exemplary embodiment, the program of the group registering process is stored in advance in the storing unit 26. However, the present invention is not limited to this. For example, the program of the group registering process may be received from an external apparatus via the communication line I/F unit 28 and executed. Furthermore, the program of the group registering process recorded in a recording medium such as a compact disc-read only memory (CD-ROM) may be read by a CD-ROM drive or the like so that the group registering process may be preformed.

An external storage such as a universal serial bus (USB) memory or a memory card is connected to the image forming apparatus 10. For example, as illustrated in FIG. 11, a group storing region for storing image forming information stored for each group is provided at the external storage. Furthermore, in the group storing region, management information for managing image forming information stored in the external storage and the image forming information are stored for each group. In the case where an external storage at which a group storing region for a group to which the image forming apparatus 10 belongs is not provided is connected to the image forming apparatus 10, a group storing region for the group to which the image forming apparatus 10 belongs is built in the external storage.

In the example illustrated in FIG. 11, in a group storing region for a "group A", the above-mentioned management information and a file A and a file B1, which are image forming information, are stored. For example, as illustrated in FIG. 12, in the management information, the file name of image forming information, the user name of a user who has transmitted the image forming information, and a timestamp indicating the time at which the image forming information was received are stored in association with one another for each piece of image forming information.

In step S401 to S409, processing similar to that of steps S101 to S109 in FIG. 4 is performed.

In step S411, the CPU 20 determines whether or not an external storage is connected to the image forming apparatus 10. In the case where it is determined in step S411 that an external storage is connected (S411, Y), the process proceeds to step S413. In the case where it is determined in step S411 that an external storage is not connected (S411, N), execution of the program of the group registering process ends.

In step S413, the CPU 20 determines whether or not image forming information of a group to which the image forming apparatus 10 belongs is stored in the external storage. In the case where it is determined in step S413 that image forming information of the group to which the image forming apparatus 10 belongs is stored (S413, Y), the process proceeds to step S415. In the case where it is determined in step S413 that image forming information of the group to which the image forming apparatus 10 belongs is not stored (S413, N), execution of the program of the group registering process ends.

In step S415, the CPU 20 determines whether or not recovery of the image forming information of the group to which the image forming apparatus 10 belongs, the image forming information being stored in the external storage, using a predetermined decryption key provided for each group is successful. Each of the image forming apparatuses 10 stores in advance a decryption key corresponding to the group to which the image forming apparatus 10 belongs. In the case where it is determined in step S415 that recovery is successful (S415, Y), the process proceeds to step S417. In the case where it is determined in step S415 that recovery is not successful (S415, N), execution of the program of the group registering process ends.

In step S417, the CPU 20 causes the storing unit 26 to store the recovered image forming information.

In step S419, the CPU 20 deletes the image forming information stored in the external storage, the image forming information being recovered in step S415, from the external storage.

In step S421, the CPU 20 updates the management information such that the image forming information deleted from the external storage is deleted from the management information, and execution of the program of the group registering process ends.

Figure 13:
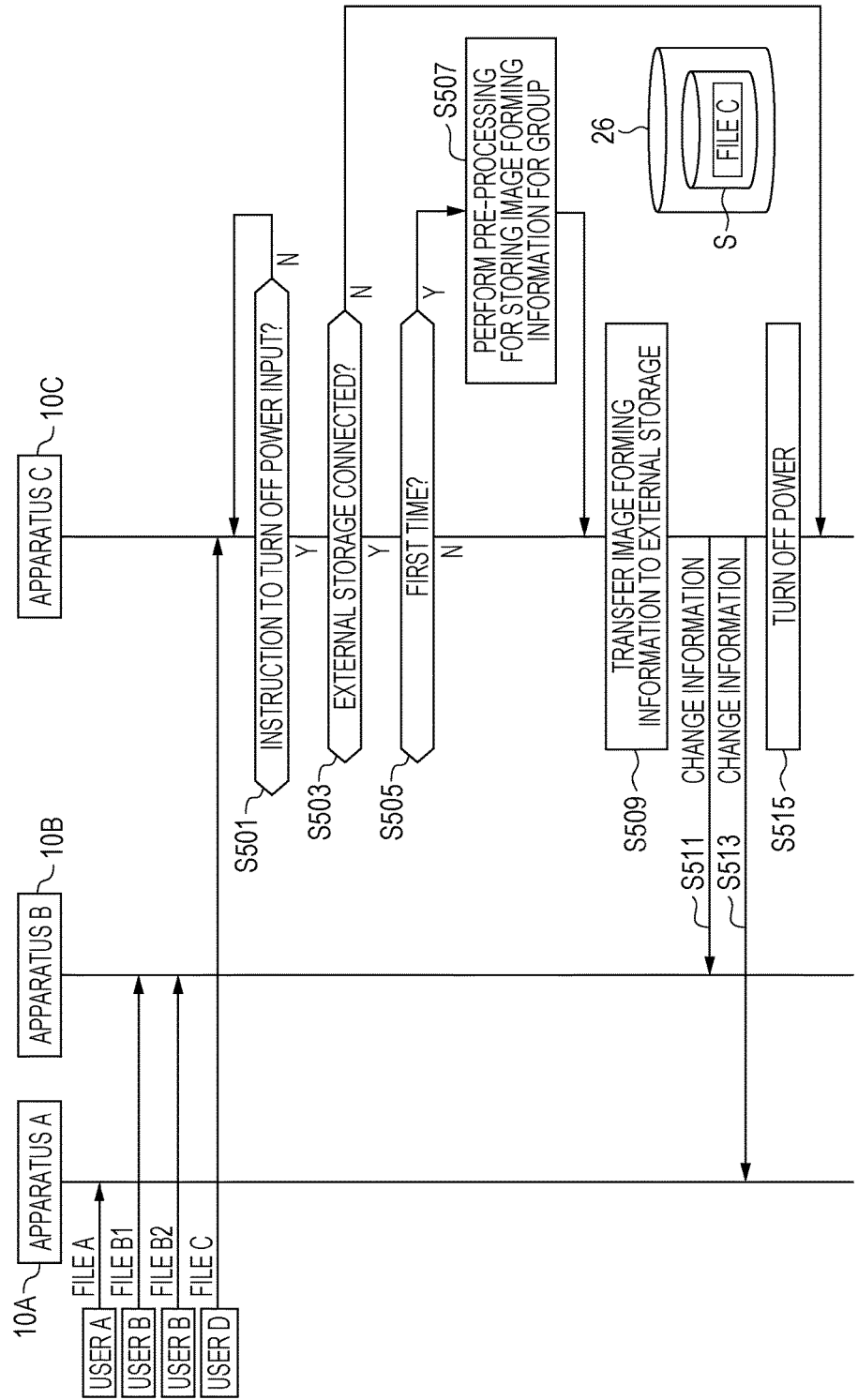
FIG. 13 is a flowchart illustrating the processing flow of a program of a data transmitting process according to the third exemplary embodiment.

Next, the flow of a data transmitting process performed by the image forming apparatus 10 according to the third exemplary embodiment will be described with reference to a flowchart of FIG. 13. FIG. 13 is a flowchart illustrating the processing flow of a program of the data transmitting process performed by the CPU 20 at a timing when an instruction to turn off the power of the image forming apparatus 10 is issued. In the third exemplary embodiment, the program of the data transmission process is stored in advance in the storing unit 26. However, the present invention is not limited to this. For example, the program of the data transmitting process may be received from an external apparatus via the communication line I/F unit 28 and executed. Furthermore, the program of the data transmitting process recorded in a recording medium such as a CD-ROM may be read by a CD-ROM drive or the like so that the data transmitting process may be preformed.

A case where an apparatus A, an apparatus B, and an apparatus C belong to one group and the apparatus C performs the data transmitting process will be explained.

In step S501, the CPU 20 determines whether or not an instruction to turn off the power is input by a user using the display operation unit 30. In the case where it is determined in step S501 that an instruction to turn off the power is input (S501, Y), the process proceeds to step S503. In the case where it is determined in step S501 that an instruction to turn off the power is not input (S503, N), the CPU 20 waits until an instruction to turn off the power is input.

In step S503, the CPU 20 determines whether or not an external storage S is connected to the image forming apparatus 10. In the case where it is determined in step S503 that the external storage S is connected (S503, Y), the process proceeds to step S505. In the case where it is determined in step S503 that the external storage S is not connected (S503, N), execution of the program of the data transmitting process ends.

In step S505, the CPU 20 determines whether or not the connection of the external storage S is the first-time connection, that is, whether or not a group storing region for a group to which the image forming apparatus 10 belongs is provided at the external storage S. In the case where it is determined in step S505 that the connection is the first-time connection (S505, Y), the process proceeds to step S507. In the case where it is determined in step S505 that the connection is not the first-time connection (S505, N), the process proceeds to step S509.

In step S507, the CPU 20 performs pre-processing for storing image forming information for the group. In the third exemplary embodiment, a group storing region for the group to which the image forming apparatus 10 belongs is built in the external storage S.

In step S509, the CPU 20 transfers the image forming information to the external storage S. The transferred image forming information is stored in the group storing region in the external storage S for the group to which the image forming apparatus 10 belongs.

In steps S511 and S513, the CPU 20 performs processing similar to that of steps S223 and S225 in FIG. 5, and execution of the program of the data transmitting process ends.

As described above, in the third exemplary embodiment, in the case where an external storing device is connected to the image forming apparatus 10 and image forming information is stored in the external storing device, the image forming apparatus 10 acquires the image forming information from the external storing device. Furthermore, in the case where an external storing device is connected to the image forming apparatus 10, the image forming information is stored into the external storing device at the above-mentioned predetermined timing.

Accordingly, image forming information is stored in an external storing device, and the image forming information is thus backed up. Consequently, elimination of the image forming information is avoided.

Fourth Exemplary Embodiment

Next, an image forming system 100 according to a fourth exemplary embodiment will be described.

In the third exemplary embodiment, a case where image forming information stored in an external storage is acquired when the image forming information stored in the external storage is acquired irrespective of whether or not the image forming apparatus 10 has a storage capacity for storing the image forming information stored in the external storage, has been explained. In the fourth exemplary embodiment, a case where image forming information stored in an external storage is acquired when the image forming apparatus 10 has a storage capacity for storing the image forming information stored in the external storage, will be explained.

As illustrated in FIGS. 1 and 2, the configuration of an image forming system 100 according to the fourth exemplary embodiment is the same as that of the image forming system 100 according to the first exemplary embodiment. Therefore, explanation for the configuration of the image forming system 100 according to the fourth exemplary embodiment will be omitted.

Figure 14:
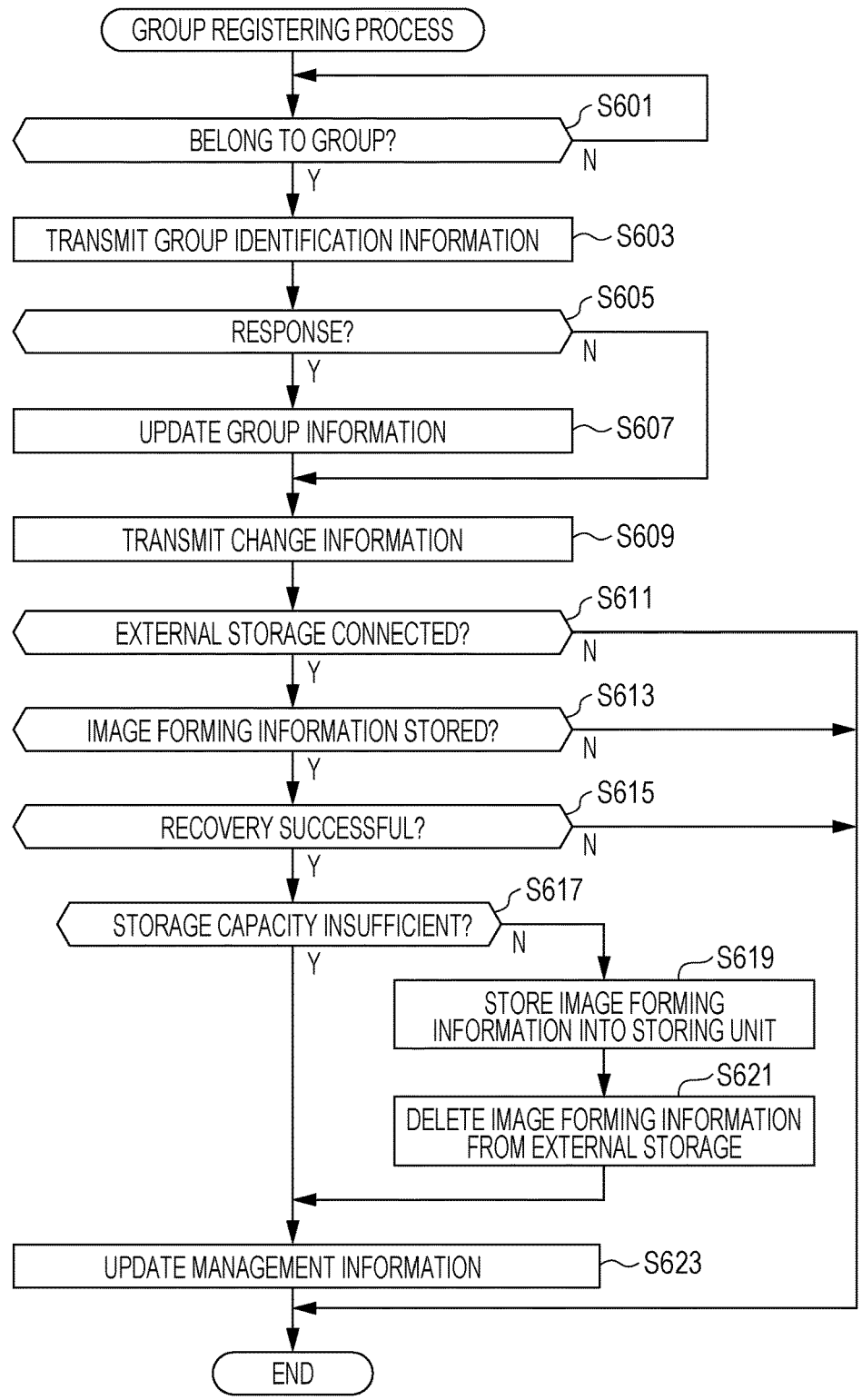
FIG. 14 is a flowchart illustrating the processing flow of a program of a group registering process according to the fourth exemplary embodiment.

First, the flow of a group registering process according to the fourth exemplary embodiment will be described. FIG. 14 is a flowchart illustrating the processing flow of a program of a group registering process performed by the CPU 20 at a timing when the power of the image forming apparatus 10 is turned on. In the fourth exemplary embodiment, the program of the group registering process is stored in advance in the storing unit 26. However, the present invention is not limited to this. For example, the program of the group registering process may be received from an external apparatus via the communication line I/F unit 28 and executed. Furthermore, the program of the group registering process recorded in a recording medium such as a CD-ROM may be read by a CD-ROM drive or the like so that the group registering process may be preformed.

An external storage such as a USB memory or a memory card is connected to the image forming apparatus 10. For example, as illustrated in FIG. 11, a group storing region for storing image forming information stored for each group is provided at the external storage. Furthermore, in the group storing region, management information for managing image forming information stored in the external storage and the image forming information are stored for each group. In the case where an external storage at which a group storing region for a group to which the image forming apparatus 10 belongs is not provided is connected to the image forming apparatus 10, a group storing region for the group to which the image forming apparatus 10 belongs is built in the external storage.

In steps S601 to S615, processing similar to that of steps S401 to S415 of FIG. 10 is performed.

In step S617, the CPU 20 determines whether or not the storing unit 26 has an insufficient storage capacity for loading image forming information stored in an external storage. In the case where it is determined in step S617 that the storing unit 26 has a sufficient storage capacity (S617, N), the process proceeds to step S619. In the case where it is determined in step S617 that the storing unit 26 has an insufficient storage capacity (S617, Y), the process proceeds to step S623.

In step S619, the CPU 20 causes the storing unit 26 to store the image forming information stored in the external storage.

In step S621, the CPU 20 deletes the image forming information stored into the storing unit 26 in step S619 from the external storage.

In step S623, the CPU 20 updates management information such that the image forming information deleted from the external storage is deleted from the management information, and updates group information such that the image forming information deleted from the external storage is deleted from the group information. Then, execution of the program of the group registering process ends.

As described above, in the fourth exemplary embodiment, in the case where the image forming apparatus 10 has a storage capacity for loading image forming information stored in an external storing device, the image forming information stored in the external storing device is acquired.

Accordingly, image forming information is stored in an external storing device, and the image forming information is thus backed up. Therefore, elimination of the image forming information is avoided. Furthermore, occurrence of a failure caused by loading image forming information stored in an external storing device in the case where the image forming apparatus 10 does not have a storage capacity for storing the image forming information stored in the external storing device is avoided.

Low-end image forming apparatuses are space-saving apparatuses. Therefore, multiple apparatuses are often installed in an office, especially, near desks of employees in the office. In an exemplary embodiment, management information of individual image forming apparatuses 10 are provided separately for individual use and group use. Therefore, even an image forming apparatus 10 for individual use may also be used as an apparatus for group use, and the image forming apparatuses 10 may be used efficiently.

Next, a receiving process for the case where the image forming apparatus 10 receives image forming information and an image forming process for the case where an instruction for image formation is issued at the image forming apparatus 10 in each of the exemplary embodiments will be described.

A case where in each of the image forming apparatuses 10, management information illustrated in FIG. 12 is stored in the corresponding storing unit 26 will be explained. That is, each of the image forming apparatuses 10 stores management information in which a file name, a user name, and a timestamp are associated with one another for each piece of image forming information stored in the corresponding storing unit 26. Furthermore, each of the image forming apparatuses 10 stores in advance in the storing unit 26 a predetermined encryption key and a predetermined decryption key provided for each group, that is, an encryption key and a decryption key corresponding to a group to which the image forming apparatus 10 belongs.

Figure 15:
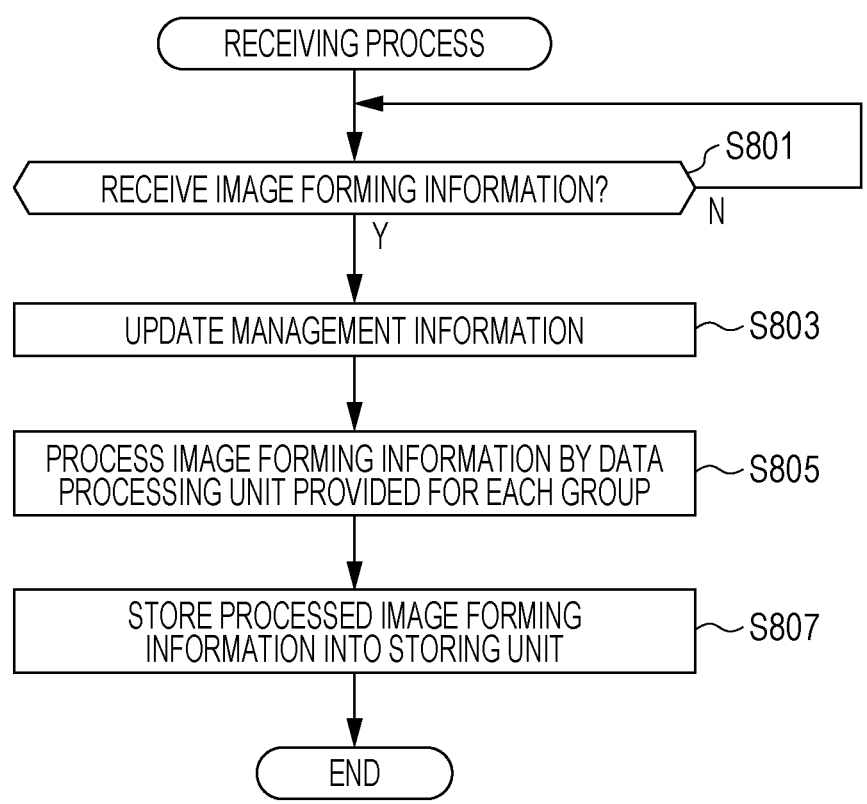
FIG. 15 is a flowchart illustrating the processing flow of a program of a receiving process according to the first to fourth exemplary embodiments.

First, the flow of a receiving process according to each of the exemplary embodiments will be explained. FIG. 15 is a flowchart illustrating the processing flow of a program of a receiving process performed every time that a predetermined time (for example, one second) has passed during a period in which the power of the image forming apparatus 10 is on. In the exemplary embodiment, the program of the receiving process is stored in advance in the storing unit 26. However, the present invention is not limited to this. For example, the program of the receiving process may be received from an external apparatus via the communication line I/F unit 28 and executed. Furthermore, the program of the receiving process recorded in a recording medium such as a CD-ROM may be read by a CD-ROM drive or the like so that the receiving process may be preformed.

In step S801, the CPU 20 determines whether or not image forming information is received from an information terminal of a user or a different image forming apparatus 10. In the case where it is determined in step S801 that image forming information is received (S801, Y), the process proceeds to step S803. In the case where it is determined in step S801 that image forming information is not received (S801, N), the CPU 20 waits until image forming information is received.

In step S803, the CPU 20 updates management information by adding the received image forming information to the management information, which is stored in the storing unit 26. In the exemplary embodiment, the file name of image forming information, the user name of a user who transmitted the image forming information, and a timestamp indicating the time at which the image forming information was transmitted are added to the management information in association with one another. Furthermore, by deleting the received image forming information from the management information stored in the external storage, the CPU 20 updates the management information. In the exemplary embodiment, information in which the file name of image forming information, the user name of a user who transmitted the image forming information, and the timestamp indicating the time at which the image forming information was transmitted are associated with one another is deleted from the management information.

In step S805, the CPU 20 processes the image forming information by a predetermined data processing unit provided for each group. In the exemplary embodiment, by encrypting image forming information with a predetermined encryption provided for each group, the image forming information is processed. In the case where encryption is already performed in image forming information, processing of step S803 may be omitted.

In step S807, the CPU 20 causes the storing unit 26 to store the processed image forming information, and execution of the program of the receiving process ends.

Next, a receiving process for the case where the image forming apparatus 10 receives image forming information and an image forming process for the case where an instruction to perform image formation is issued at the image forming apparatus 10 in each of the exemplary embodiments will be described.

Figure 16:
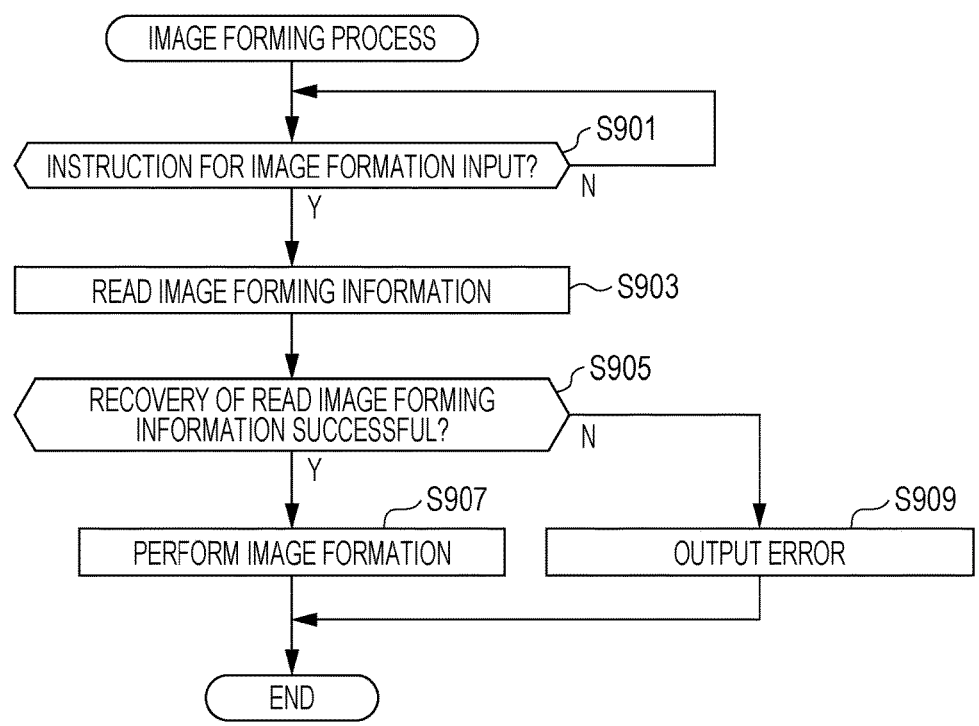
FIG. 16 is a flowchart illustrating the processing flow of a program of an image forming process according to the first to fourth exemplary embodiments.

Next, the flow of an image forming process according to each of the exemplary embodiments will be described. FIG. 16 is a flowchart illustrating the processing flow of a program of an image forming process performed every time that a predetermined time (for example, one second) has passed while the power of the image forming apparatus 10 is on. In the exemplary embodiment, the program of the image forming process is stored in advance in the storing unit 26. However, the present invention is not limited to this. For example, the program of the image forming process may be received from an external apparatus via the communication line I/F unit 28 and executed. Furthermore, the program of the image forming process recorded in a recording medium such as a CD-ROM may be read by a CD-ROM drive or the like so that the image forming process may be preformed.

In step S901, the CPU 20 determines whether or not an instruction to perform image formation is input by a user using the display operation unit 30. In the case where it is determined in step S901 that an instruction to perform image formation is input (S901, Y), the process proceeds to step S903. In the case where it is determined in step S901 that an instruction to perform image formation is not input (S901, N), the CPU 20 waits until an instruction to perform image formation is input.

In step S903, the CPU 20 reads image forming information stored in the storing unit 26.

In step S905, the CPU 20 determines whether or not recovery of the read image forming information using a predetermined decryption key provided for each group is successful. In the case where it is determined in step S905 that recovery is successful (S905, Y), the process proceeds to step S907. In the case where it is determined in step S905 that recovery is not successful (S905, N), the process proceeds to step S909.

In step S907, the CPU 20 forms an image based on the recovered image forming information on a recording medium by the image forming unit 32, and execution of the program of the receiving process ends.

In step S909, the CPU 20 outputs error information, and execution of the program of the receiving process ends.

As described above, in each of the exemplary embodiments, for transmission of image forming information, the image forming information is encrypted with an encryption key provided for each group. Therefore, loading of the image forming information by the image forming apparatus 10 which does not belong to the same group is avoided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image forming apparatus comprising:
a network communication interface;
a memory that stores: (i) image forming information indicating an image to be formed; and (ii) group information including identification information of each of a plurality of different image forming apparatuses belonging to a group to which the image forming apparatus belongs; and a processor programmed to:
cause the network communication interface to transmit the image forming information to a candidate image forming apparatus among the plurality of different image forming apparatuses belonging to the group if an instruction to turn off power of the image forming apparatus is issued; and
then turn off the power of the image forming apparatus.

2. The image forming apparatus according to claim 1, wherein the memory stores a predetermined encryption key provided for the group, and
wherein the processor is further programmed to cause the network communication interface to transmit a first image forming information encrypted with the encryption key to the candidate image forming apparatus.

3. The image forming apparatus according to claim 1, wherein the processor is further programmed to:
acquire, in a case where an external storing device is connected to the image forming apparatus and a second image forming information of a different image forming apparatus belonging to a group is stored in the external storing device, the second image forming information from the external storing device.

4. The image forming apparatus according to claim 1, wherein the processor is further programmed to, before the image forming information is transmitted to the candidate image forming apparatus, select the candidate image forming apparatus from among the plurality of different image forming apparatuses if an instruction to turn off power of the image forming apparatus is issued.

5. The image forming apparatus according to claim 1, wherein the candidate image forming apparatus is selected from among the plurality of different image forming apparatuses based on a storage capacity of each of the plurality of different image forming apparatuses.

6. The image forming apparatus according to claim 2, wherein the processor is further programmed to:
receive, via the network communication interface, a second image forming information from a different image forming apparatus belonging to the group, and decrypt the received image forming information using a decryption key, and
wherein the memory stores the decryption key, which is provided for decrypting the second image forming information encrypted with the encryption key.

7. The image forming apparatus according to claim 3, wherein in a case where the image forming apparatus has a storage capacity for loading the second image forming information, the second image forming information being stored in the external storing device, the second image forming information stored in the external storing device is acquired.

8. The image forming apparatus according to claim 3, further comprising:
a storage that causes, in a case where the external storing device is connected to the image forming apparatus, the external storing device to store the second image forming information if an instruction to turn off power of the image forming apparatus is issued.

9. The image forming apparatus according to claim 6, wherein the processor is further programmed to:
acquire, in a case where an external storing device is connected to the image forming apparatus and the second image forming information is stored in the external storing device, and if the second image forming information stored in the external storing device is able to be decrypted with the decryption key, the second image forming information from the external storing device.

10. The image forming apparatus according to claim 5, wherein the candidate image forming apparatus has a largest storage capacity among the plurality of different image forming apparatuses.

11. A non-transitory computer readable medium storing a program causing a computer to execute a process for image formation, the process comprising:
holding: (i) image forming information indicating an image to be formed; and (ii) group information including identification information of each of a plurality of different image forming apparatuses belonging to a group to which an image forming apparatus belongs;
transmitting the image forming information to a candidate image forming apparatus among the plurality of different image forming apparatuses belonging to the group if an instruction to turn off power of the image forming apparatus is issued; and
then turn off the power of the image forming apparatus.

12. An image forming apparatus comprising:
a network communication interface;
a memory that stores: (i) group information including identification information of a different image forming apparatus belonging to a group to which the image forming apparatus belongs; and (ii) a predetermined encryption key provided for the group; and
a processor programmed to:
search for a candidate image forming apparatus to which a first image forming information encrypted with the encryption key is to be transmitted at a predetermined timing when elimination of the image forming information is estimated, wherein the predetermined timing is a timing at which an instruction to turn off power of the image forming apparatus is issued;
update the group information such that the candidate image forming apparatus is included in the group;
cause the network communication interface to transmit the updated group information to the candidate image forming apparatus at the predetermined timing; and
cause the network communication interface to transmit the first image forming information to the candidate image forming apparatus within a period from acquisition of the image forming information to the predetermined timing.

13. The image forming apparatus according to claim 12, wherein the processor is further programmed to:
receive, via the network communication interface, a second image forming information encrypted with the encryption key from a different image forming apparatus belonging to the group; and
decrypt the second image forming information using a decryption key, and
wherein the memory stores the decryption key, which is provided for decrypting the second image forming information encrypted with the encryption key.

14. The image forming apparatus according to claim 12, wherein the processor is further programmed to:
acquire, in a case where an external storing device is connected to the image forming apparatus and a second image forming information of a different image forming apparatus belonging to the group is stored in the external storing device, the second image forming information from the external storing device.

15. The image forming apparatus according to claim 12, wherein in a case where the image forming apparatus has a storage capacity for loading a second image forming information of a different image forming apparatus belonging to the group, the second image forming information being stored in an external storing device, the second image forming information stored in the external storing device is acquired.

16. The image forming apparatus according to claim 12, further comprising:
a storage that causes, in a case where an external storing device is connected to the image forming apparatus, the external storing device to store the second image forming information at the predetermined timing.

17. The image forming apparatus according to claim 12, wherein the processor is further programmed to:
acquire, in a case where an external storing device is connected to the image forming apparatus and a second image forming information of a different image forming apparatus belonging to the group is stored in the external storing device, when second the image forming information stored in the external storing device is able to be decrypted with the decryption key, the second image forming information from the external storing device.

* * * * *